INVENTOR
RONALD GIANNAMORE
BY
ATTORNEY

July 2, 1968  R. GIANNAMORE  3,391,325
INVERTER START CONTROL REGULATING THE CONDUCTION
OF THE CONTROLLED RECTIFIERS
Filed Jan. 24, 1966  5 Sheets-Sheet 3

July 2, 1968  R. GIANNAMORE  3,391,325
INVERTER START CONTROL REGULATING THE CONDUCTION
OF THE CONTROLLED RECTIFIERS
Filed Jan. 24, 1966  5 Sheets-Sheet 5

United States Patent Office 3,391,325
Patented July 2, 1968

3,391,325
INVERTER START CONTROL REGULATING THE CONDUCTION OF THE CONTROLLED RECTIFIERS
Ronald Giannamore, Wapping, Conn., assignor to United Aircraft Corporation, East Hartford, Conn., a corporation of Delaware
Filed Jan. 24, 1966, Ser. No. 522,571
1 Claim. (Cl. 321—11)

ABSTRACT OF THE DISCLOSURE

A start control for an inverter employing push-pull pulse-width modulated controlled rectifiers wherein the conduction time of the controlled rectifiers is cut back to a minimum duration upon the sensing of a start-up signal, the signal being initiated by a capacitor, resistor combination.

---

This invention relates to a novel controlled rectifier circuit for the inversion of D.C. power to A.C. power.

Inverter circuits for the transformation of D.C. power to A.C. power have been available for some time in various combinations. Of specific interest is the circuit described in the patent to Francis Lawn, No. 2,872,635. The circuit in this patent comprises a third controlled rectifier to extinguish one or two parallel power rectifiers by use of a commutating capacitor. In high power inverters two parallel power rectifiers are operated alternately to discharge high currents into a common impedance such as the primary of a transformer.

In recent times the development of the silicon controlled rectifier (SCR) has greatly contributed to the inverter art by providing a simple and efficient element to replace the gas-type thyratrons described in the earlier Lawn patent. The SCR, however, exhibits operating characteristics which may render high power inverters unstable, complicated to control and difficult to activate unless special precautions are taken. For instance, when the voltage applied to the gate of an SCR drops to a range below the required minimum the firing of the device becomes erratic. With such low gating voltage some SCR's will be gated on (firing) where as others may not. Hence, with low gating voltages operation of the parallel power SCR circuit may become unsymmetrical with time and low gate voltages may, for instance, be encountered during the initial turning on of an inverter or when the input D.C. voltage drops below a safe value.

The parallel 3 SCR circuit as described in the Lawn patent utilizes two power rectifiers, SCR1 and SCR2 which are fired alternately 180° apart in phase. A third control SCR is then used to control the firing time of the power SCRs. By controlling the firing time of the third SCR, power and voltage regulation of the output of the inverter is obtained. The two power rectifiers are fired symmetrically in time to avoid output transformer saturation that causes excessive currents through the power SCRs with subsequent failures.

It is essential that these undesirable operating conditions be detected and corrected in an efficient and quick manner. Such speedy correction is provided in this invention by a circuit incorporating a fourth SCR which extinguishes the power SCRs by removal of their D.C. power a short instance after a malfunction is detected. In addition, the instability problem that may occur at turn on with low anode-to-cathode voltage across the power SCRs is avoided in a similar manner by temporarily removing the D.C. power from the power SCRs until the D.C. input power has reached a sufficiently high value. Further precautions are made in response to these malfunctions by cutting back on the conduction angles, also called conduction times, of the power controlled rectifiers to predetermined minimum angles or durations.

A typical situation where at turn on the D.C. power is low occurs when the inverter is used in combination with a power supply to provide a combined conversion of A.C. power at one frequency to A.C. power at a second frequency. Thus, where 60 c.p.s. power is available but 400 c.p.s. power output is needed, a conversion may be conventionally accomplished by first rectifying and filtering the input A.C. power to produce D.C. power and then inverting the D.C. power to the desired A.C. output power frequency. Since the D.C. power is derived through a filter to remove most of the input ripple, it will rise relatively slowly to the design level and during this rise unstable firing of the power SCRs may be avoided by the activation of the fourth SCR.

A short-circuit sensing device to protect the inverter circuitry is specially needed with regulated inverter outputs. The response of the short-circuit sensor must be fast to provide the desired protection. Hence, immediate removal of the D.C. power from the power rectifiers upon the occurrence of a short circuit is provided by this invention.

Since a short circuit often occurs in an equipment that itself is protected with fuses or circuit breakers and other equipments powered by the inverter should not be disabled by the short circuit occurring in the one equipment, the latter may be removed from the inverter output circuit by forcing a high constant short-circuit output current to effectively blow its fuse or trip its circuit breaker. Special circuitry to quickly produce this effect and prevent instability in the response of the inverter system is provided for by this invention.

In multiphase inverters, shorts may occur in one particular phase and not in others causing unsymmetric loading, misfiring of the power SCRs, and damage to circuitry. In this invention the phase having a short is identified and appropriate action is taken to protect the circuitry.

Other features and advantages will be apparent from the specification and claim, and from the accompanying drawings which illustrate an embodiment of the invention.

It is therefore an object of this invention to provide a novel start control for an inverter employing controlled rectifiers.

It is a further object of this invention to provide a novel start-up control for an inverter using push pull pulse width modulated controlled rectifiers for regulation wherein the conduction time of the controlled rectifiers is cut back to a minimum duration upon the sensing of a start up.

Figure 1:
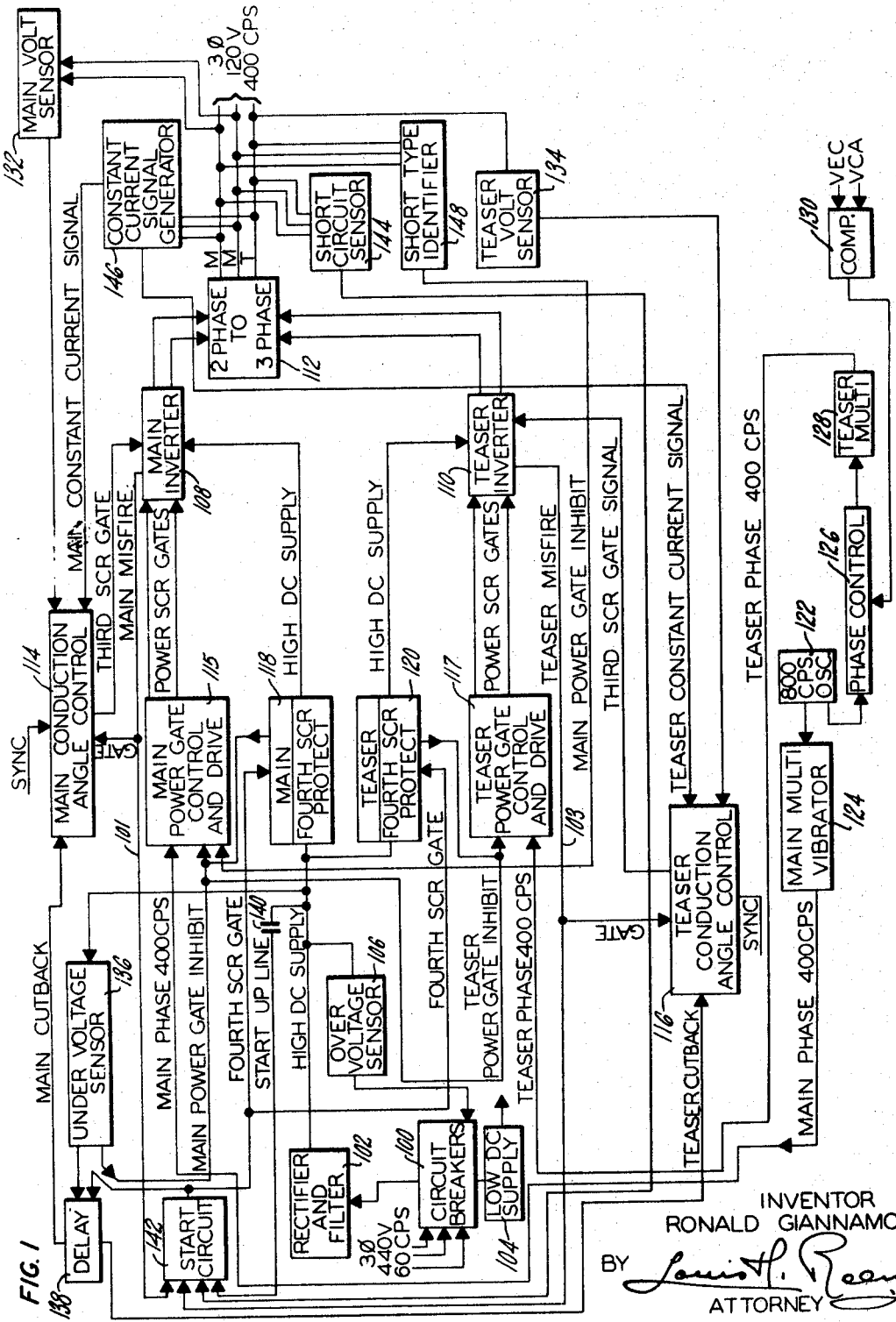
FIGURE 1 shows a system block diagram of a three-phase inverter of this invention in combination with a power supply.

In FIGURE 1 a block diagram of a complete system comprising a power supply and an inverter combination is shown. The input power is 440 volts three-phase 60 c.p.s. which is fed into a three-phase circuit breaker arrangement 100. The three-phase output from the circuit breakers is fed to a three-phase rectifier and filter arrangement 102 to produce high D.C. power at 250 volts. The high D.C. supply is then used to power the inverter for the production of the 400 c.p.s. output power. In addition, the three-phase input power is used to provide a low D.C. supply voltage 104 which has an unregulated and a regulated portion. The regulated portion produces a D.C. supply for the activation of the control circuitry. The unregulated portion of the low D.C. supply provides immediate activation when input A.C. power is applied to permit certain circuits to respond rapidly. An overvoltage sensor circuit 106 senses the high D.C. supply voltage and trips the circuit breakers 100 when the high D.C. supply exceeds a predetermined value.

The inverter comprises a two-phase system which then is transformed by a standard two-phase to three-phase transformation to produce the three-phase 400 cycle output power. The two-phase system includes a main inverter 108, a teaser inverter 110 which drives a two-phase to three-phase transformer combination 112. The main inverter is controlled by a main conduction angle control 114 together with a main power gate control and drive 115. Similarly, the teaser inverter 110 is controlled by a teaser conduction angle control 116 and a teaser power gate control drive 117.

The control of the main and teaser phases relative to one another is provided by the phase control circuitry comprising an 800 c.p.s. oscillator 122 driving a main multivibrator 124 which in turn supplies the main power gate control and drive circuitry 115 with the basic 400 c.p.s. volts signal. The other side of the 800 c.p.s. oscillator 122 is fed to a phase control 126, the output of which triggers the teaser power multivibrator 128 and this in turn supplies the teaser gate control and drive circuitry 117 with the basic 400 c.p.s. triggering signal. Phase control 126 receives an input from comparator circuitry 130 which has its inputs connected to two of the output three phases so that a comparison can be made between the magnitude of the main and teaser phases for relative phase control.

The main voltage regulation is accomplished by sensing the main phase output voltage with a sensor 132 and deriving therefrom an equivalent D.C. voltage which is used to control the angle of conduction of the main inverter via the main conduction angle control 114. Similarly, the teaser voltage is regulated by sensing the teaser output voltage with a sensor 134 and an equivalent D.C. voltage which is applied to the teaser conduction angle control 116.

An undervoltage sensor 136 senses the fact that the D.C. supply has a voltage below a permissible value and produces an output signal upon the detection thereof to inhibit the pulses to the main power gates and the teaser power gates. In addition, an undervoltage signal is applied via a delay network 138 to the main conduction angle control 114 and the teaser conduction angle control 116 to cut back on both the main and teaser inverters conduction angles. This controls the overshoot during start up when the input D.C. voltage rises to its design value.

A special starter circuit is provided by sensing the rise of the high D.C. supply through a capacitor network 140 which activates a start circuit 142. The output of the start circuit is applied to both the main and teaser fourth SCR protect circuits 118 and 120, respectively, as well as the delay network 138 after the fourth SCRs have been fired to cut back initially on the conduction angles of the main and teaser inverters. In this manner, the startup conditions of the main and teaser inverters are preset so that the output power is built up gradually from zero to regulated levels with a controlled overshoot, if any, response.

Upon the sensing of a short circuit in any of the three output phases, a signal is produced from a short circuit sensor 144 which initiates a similar response in the main inverter and teaser inverter as well as their control circuitry as that produced by the startup circuitry. Hence, the short circuit sensor output is connected to the input of start circuit 142.

Under certain conditions the main or teaser inverter may be firing unsymmetrically and unreliably. On each of these main and teaser inverters a misfire detection circuit is connected to produce an output signal 101 and 103, respectively, indicative of such a malfunction, and each of these is connected to the start circuit 142 to again initiate both a disconnection of the high D.C. supply from main and teaser inverters as well as a cutback in the main and teaser conduction angles.

As soon as an abrupt short circuit has been sensed by the sensor 144, a constant current signal sensor 146 takes over control to establish a constant current output from the main and teaser inverters to assure the tripping of the circuit breaker or the blowing of the fuse of the equipment responsible for the short circuit. The outputs of the constant current control sensor 146 is applied to the main conduction angle control 114 and a teaser conduction control 116. Constant current control signal sensor 146 senses each of the currents in the three-phase output windings and its output is proportional to the current in the loads. Under certain circumstances, however, it is essential that the type of short be identified in order to completely prevent the main inverter from firing. Such identification is provided by short-type identified circuit 148 which, when activated, produces an output signal for the inhibition for the main power gates at the main power gate control and drive circuitry 115.

*3 SCR operation*

Figure 2:
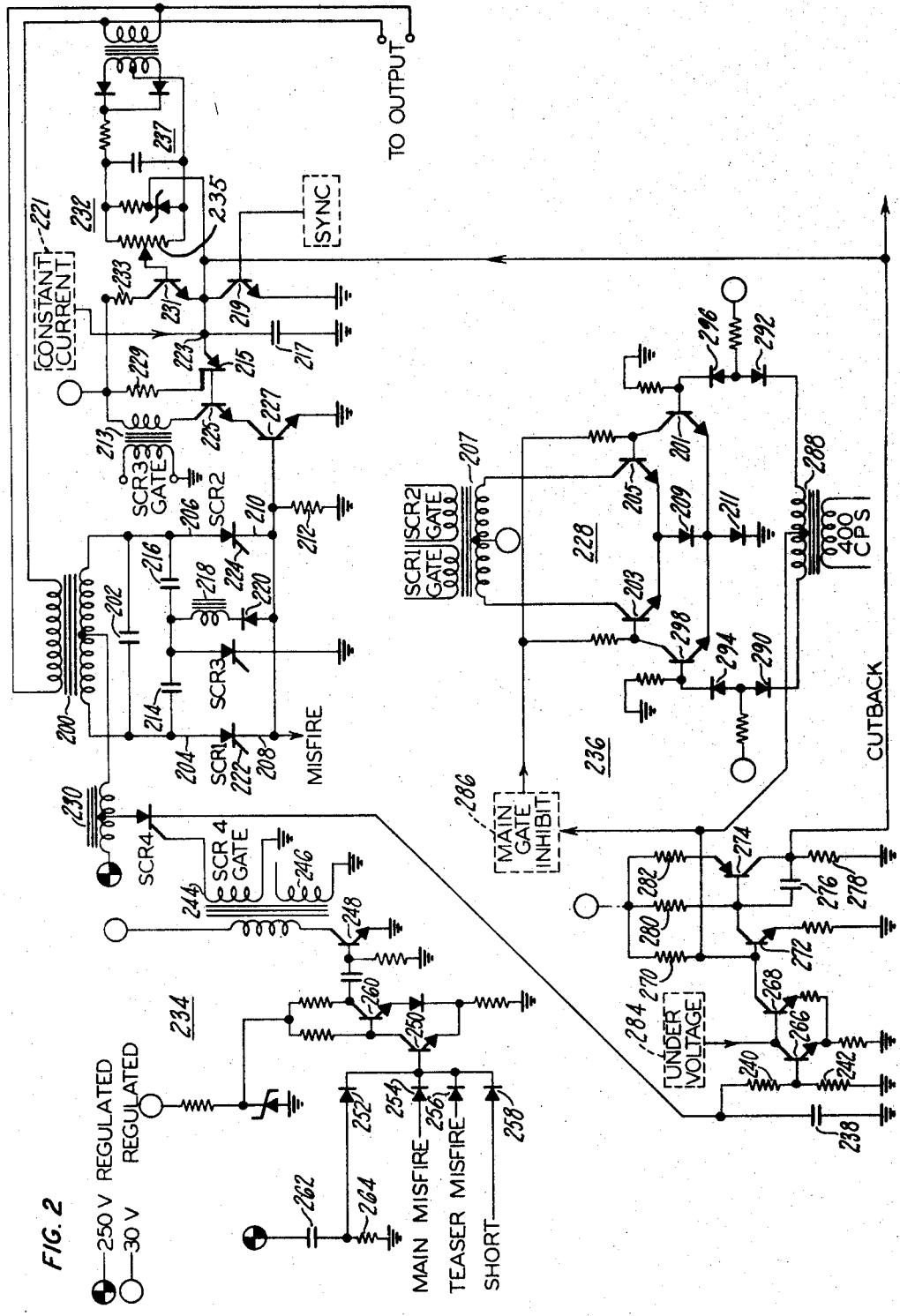
FIGURE 2 shows a partial schematic representation of the logic and control circuitry for the inverter.

The main and teaser inverters herein described each operate on the 3 SCR inverter principle wherein two power SCRs are fired in parallel and sequentially and a third SCR is used to extinguish the ON power SCR. FIGURE 2 shows SCR1 and SCR2 having their anodes connected to the primary of a transformer 200 and a capacitor 202 connected across the primary of the transformer and coupling the two anodes 204 and 206.

The cathodes 208 and 210 are connected together and to ground via a small resistor 212. A third SCR has its anode connected to the anodes 204 and 206 via capacitors 214 and 216, respectively. The cathode of SCR3 is connected to ground. Also connected to the anode of SCR3 is a choke 218 in series with a diode 220 with the anode of the diode connected to the cathodes 208 and 210 of SCRs 1 and 2. The power SCRs 1 and 2 have their gates 222 and 224 connected to a gating signal which is supplied from a common 400 c.p.s. gating signal source and driver, generally indicated at 228. The primary of transformer 200 is supplied with high voltage D.C. power through an auto transformer 230. The gating signal for the third SCR is obtained from a conduction angle control circuitry generally indicated at 232.

Figure 5:
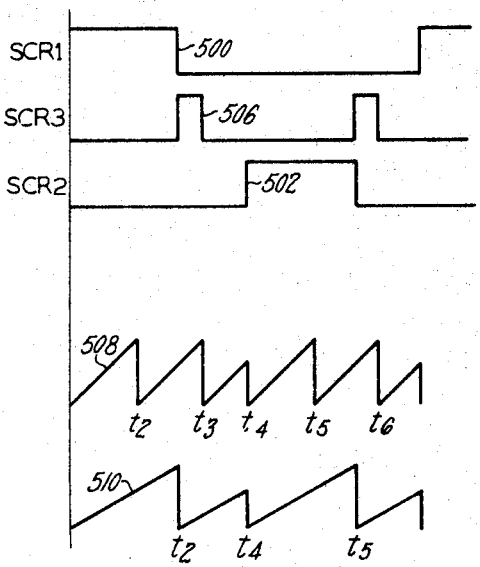
FIGURE 5 shows the firing time relationship of a three SCR circuit.

In operation, the three SCR power circuitry functions as follows. Assuming that SCR1 is conducting and SCR2 is off. In that case the anode at SCR1 is essentially at ground potential except for the small voltage across the resistor 212 as well as the potential across the SCR1. Conduction of SCR1 would continue unless it is turned OFF which is accomplished by firing the third SCR at the appropriate and controlled time. When SCR3 is turned ON, its anode voltage, which is at some positive potential because of the voltage divider network formed by the capacitors 214 and 216, will be discharged to ground and a negative pulse is applied to the anodes of SCRs 1 and 2. Hence, the anode of 204 drops below ground thereby shutting OFF the conducting SCR1. The nonconducting anode of SCR2 which was at some positive potential of approximately B+ will drop close to ground potential for a short time. Hence, SCR3 acts as a device to turn OFF either of the conducting power SCRs. The time at which the third SCR is activated is controlled by the conduction angle control circuitry so that the power delivered to the load to the transformer 200 as well as the output voltage may be controlled. The third SCR is again automatically extinguished by the combined resonating action of the choke 218, and the capacitors 214 or 216. With reference to FIGURE 5, the waveforms 500 and 502 show the respective firing times of the power SCRs 1 and 2. The SCR3 waveform 506 shows that its conduction will terminate the conduction of either one of the conducting power rectifiers. Hence, for an output power frequency of 400 cycles, each power SCR is fired once and the other is fired 180° out-of-phase.

This three SCR inverter scheme is applicable to both the main inverter 108 and the teaser inverter 110. Each of these inverters is provided with a power SCR gating control and drive 228 and a third SCR conduction angle control 232. These controls correspond to the power gate control and drives 115 and 117 and the conduction angle controls 114 and 116 in FIGURE 1. It is, of course, conceivable that for higher power applications, several power SCRs may be connected in series as well as parallel; for instance, where SCR1 represents two silicon control rectifiers connected in series in conventional manner.

Control circuitry

With further reference to FIGURE 2, the schematic representation of the control features provided with this inverter may be observed. The control includes a fourth SCR power removal circuit generally indicated at 234. In addition, a gate inhibiting circuit and a conduction angle cutback circuit is generally indicated at 236.

The power removal circuit comprises a fourth SCR which has its anode connected to the center tap of the auto transformer 230. As previously mentioned, this auto transformer is in series with the high D.C. power source that provides the power for the main and teaser inverters. The fourth SCR has its cathode connected to ground via capacitor 238 as well as the series resistor voltage divider network consisting of resistors 240 and 242. The gate of the fourth SCR is connected to a secondary of a transformer 244 which is further provided with another secondary winding 246 for powering the fourth SCR in the other power inverter circuit. The primary of transformer 244 is connected to the low voltage power supply and to the collector of a transistor 248. Transistor 248 is activated upon the occurrence of a signal at the base of transistor 250 from either of the four inputs through diodes 252, 254, 256 and 258. Transistor 250 together with transistor 260 form a Schmidt trigger. The functional inputs in the diodes are respectively the startup circuit through diode 252, the main misfire detection signal through diode 254, the teaser misfire detection signal through diode 256 and the short sensor detection signal through diode 258. Upon the occurrence of either of these signals, the SCR4 will be triggered ON. Prior to the triggering of SCR4 the capacitor 238 will be discharged through the series resistor combination 240 and 242. When the SCR4 is triggered it effectively shorts the center tap of the auto transformer 230 to ground. By transformer action the voltage applied to the inverter at transformer 200 goes negative and forces the power SCRs 1 and 2 as well as the SCR3 to be shut off. In addition, after a small delay determined by the combination of the capacitor 238 and the resistors 240 and 242, the gate signals to the power SCRs of both the main and teaser inverters will be removed by the gate removal circuit 236. The turning OFF of the fourth SCR is provided by the resonant circuit combination of the choke 230 and the capacitor 238 so that approximately a half cycle later at the resonant frequency the SCR4 will be shut off. This frequency must be selected sufficiently long so that the power SCRs in the main and teaser inverters may be shut off.

The misfire signals applied through diodes 254 and 256 are derived from a network placed in series with the power SCRs of the main and teaser inverters. As shown in FIGURE 2, the cathode of SCR1 and SCR2 are returned to ground through a small resistor 212. This resistance of 212 must carry very large currents so its value is of the range of 1/10 of one ohm. This value is selected in order to provide a suitable level when a misfiring of the power SCRs 1 and 2 occurs. Such a misfiring may be observed when both conduct at the same time in which case unsymmetrical operation of the inverter will cause destruction. With both of the SCRs 1 and 2 conducting, the voltage across the resistor 212 will rise to a sufficiently high level to force a triggering of the Schmidt trigger formed by transistors 250 and 260 and activate the fourth SCR circuit. The detection of the startup signal through diode 252 is obtained by observing the rise in potential of the high voltage D.C. power supply through the capacitor 262 and resistor 264 combination. When the voltage at the input to capacitor 262 rises in response to the application of input power, the rise is passed on through the capacitor and a sufficient high voltage across the resistor 264 is developed to trigger the SCR4. The short-circuit detection signal will be described in more detail hereinafter.

The gate inhibit or removal circuit 236 is activated by the triggering of one of the fourth SCRs and couples the signal detected across the voltage divider network formed by resistors 240 and 242 to turn on transistor 266 which is normally off. Turning transistor 266 ON causes the transistor 268 which has its base connected to the collector of transistor 266 to turn OFF since it is normally on.

The turning OFF of transistor 268 in turn causes its collector to rise to the B+ potential since the collector of transistor 268 is connected through resistor 270 to the low regulated B+ supply. The high rise in the collector of transistor 268 turns ON transistor 272, the collector of which rises sufficiently to turn ON transistor 274 which has its base connected to the collector of transistor 272. A capacitor 276 is connected from the base to the collector of transistor 274 and the common junction of the capacitor and the collector of transistor 274 in turn is returned to ground through a resistor 278. The common point of the capacitor 276 and resistor 278 is then connected to the conduction angle control circuit for both the main and teaser inverters. The polarity of the signal across the resistor 278 is such as to cause a substantial cutback in the conduction angle and it becomes effective after some delay produced by the combination of the capacitor 276 and the resistor 278. The base and the emitter of transistor 274 are connected to the low regulated B+ supply via resistors 280 and 282, respectively.

Another input to the gate inhibit circuit 236 is provided by the undervoltage network to be described in more detail hereafter. The output of the undervoltage circuit 284 is connected to the base of transistor 268 and has such polarity to turn that transistor OFF when an undervoltage signal is detected. The collector of transistor 268 therefore produces an output pulse relatively quickly after either an undervoltage signal has been detected or when one of the fourth SCRs has been fired. This signal is then applied to the gate inhibit circuit 228. As shown in FIGURE 2, the inhibit signal in the case of the gate drive network for the main inverter is connected to main gate inhibit circuit 286 as well as the center tap of the transformer 288 and in the case of the teaser inverter is connected only to the center tap of the transformer 288 coupling the 400 cycle power gate pulses to the drive circuitry. The main gate inhibit circuitry 286 will be described in more detail hereafter.

The gate drive circuitry 228 has a transformer 288 which in turn has both ends of its secondary connected to a pair of back-to-back diode combinations. The secondary is connected to the cathode of diodes 290 and 292 and the anode of each of these diodes is connected to the anode of another pair of diodes 294 and 296, respectively. The common point between the anodes is connected in both series diode combinations to the low regulated B+ supply through a resistor. Each of the cathodes of the series diode combinations is then connected to the base of a transistor 298 and 201, each of which together with transistors 203 and 205 provides the amplification necessary to drive the SCR1 and SCR2 gates through transformer 207. In the teaser gate drive circuit, the base of transistors 203 and 205 are connected to the low regulated B+ supply through a resistor whereas in the main inverter circuit these bases are connected to the low regulated B+ supply by means of an auxiliary transistor switch located in the main gate inhibit circuit 286 and will be described in more detail hereafter. Each of the emitters of transistors 203 and 205 are connected via a diode 209 to the emitters of transistors 298 and 201. The emitters of these last-mentioned transistors are then connected to ground via a diode 211.

In operation, a 400 cycle signal is applied to the primary transformer 288 and produces an alternating signal across the secondary. Hence, each of the diode pairs which is forwardly biased is alternately made nonconductive so that the base of transistors 298 and 201 may alternately drop to ground potential thereby shutting them OFF. Consequently, transistors 203 and 205 are made conductive alternatively to drive the output transformer 207 and supply gating pulses to the gates of SCR 1 and 2 from its secondary.

*Conduction angle control*

As previously mentioned, voltage, short circuit constant current, and cutback control of either the main or teaser inverter is obtained through the conduction angle control circuitry generally indicated at 232 in FIGURE 2. Both the main and the teaser inverters are provided with such a control circuit. In addition, a synchronization pulse together with a stability control circuit are applied to this circuit. The output of the conduction angle control circuit is applied to the control gate of the third SCR through transformer 213. The basic control is provided by a unijunction transistor 215 which conducts when its input exceeds a predetermined value. The input of unijunction 215 is connected to ground through a capacitor 217 and the collector of a transistor 219 which has its emitter connected to ground and its base connected to a synchronization circuit. The input of unijunction 215 is further connected to the output of a constant current sensing circuit 221, to the cutback line from power gate inhibit circuit 236 and to the output of the load voltage sensor circuit 237 for voltage regulations. The unijunction transistor has a stable triggering voltage which, when exceeded at the emitter input 223, will cause an output pulse to be applied to the base of transistor 225 and provided transistor 227 is conducting, permit a pulse to be applied across the primary of transformer 213. To accomplish this, a collector of transistor 225 is connected to the primary of transformer 213 and its emitter is connected to the collector of transistor 227 which has its emitter returned to ground. The other base of the unijunction 215 is returned to a very stable B+ supply through resistor 229. This stable B+ supply may be derived through standard techniques from the unregulated 30 volt supply.

The load voltage from circuit 237 is a D.C. voltage derived by rectifying the output voltage from the inverter, filtering it and applying a portion of the D.C. potential to the base of transistor 231 which has its emitter connected to the input of unijunction 215 and its collector connected to the regulated B+ through resistor 233.

In operation, the conduction angle control operates by charging the capacitor 217. When the voltage across the capacitor reaches the triggering voltage for the unijunction transistor, a pulse will be applied to the SCR3 gate which then causes the third SCR to conduct and consequently shut off any conducting power SCRs. By varying the voltage across the capacitor 217, control may be exercised over the time when the third SCR is fired. As shown in FIGURE 5, waveforms 508 and 510 show the voltage across the capacitor 217. Waveform 510 is intended to coincide with the timing of the waveforms 500, 502 and 506. The waveform 508 shows the voltage across the capacitor with low load and thus a large control signal from the voltage control network through resistor 231.

As can be seen, the synchronization pulse occurring at times T1, T4 and T7 reset the waveforms across the capacitor to ground level by shorting the input to ground through transistor 219. In the absence of a control signal, the waveform across the capacitor looks like waveform 508 and when the inverter is running at regular load, it has the appearance of waveform 510. Hence, when the capacitor reaches the triggering voltage for unijunction 215 at time T2, the third SCR is fired and SCR1 is extinguished. A short time later when a capacitor again commences to charge up due to the voltage produced by transistor 231, the synchronization pulse occurs and resets the voltage across the capacitor 217.

*Inverter stability control regulating the firing time of the power rectifiers*

As can be seen from the waveform 508, there are several times during each half cycle at which a gating pulse can be applied to the third SCR from the unijunction transistor, i.e., time T2 and at time T3. The first pulse occurring at T2 is the desirable one for firing the third SCR and the second one occurring at T3 is the undesirable. The pulse occurring at time T3 may or may not cause circuit difficulty depending upon whether or not the anode of the third SCR is positive with respect to its cathode. If it is positive, it will cause the third SCR to fire more than once every other half cycle causing output instability and sometimes misfiring of the inverter because the third SCR has a relatively long anode charge-up time resulting in insufficient anode voltage for firing of the third SCR at time T5. This will, of course, result in unsymmetrical operation of the three SCR inverter circuit saturate the transformers and tend to produce short circuits in the inverters with catastrophic failures. To avoid this, a logic connetcion is made to avoid the second firing of the third SCR by enabling transistor 227 only when one of the power SCRs 1 or 2 is conducting. The enabling of transistor 227 allows a triggering pulse to be applied to the third SCR gate which then shuts off the conducting power SCR and this removes the voltage across the resistor 212. By connecting the base of transistor 227 to the resistor 212 this enabling feature is simply provided for.

*Undervoltage circuit*

Figure 6:
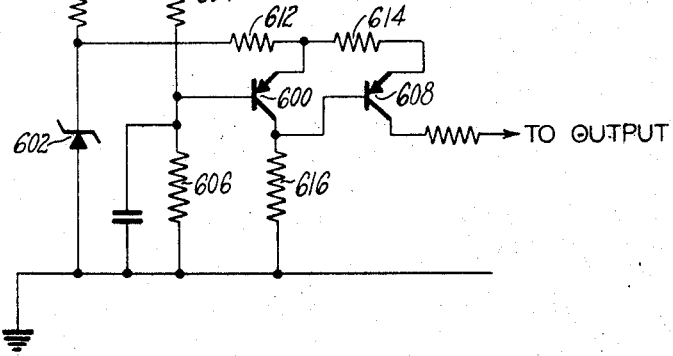
FIGURE 6 shows an undervoltage protection circuit.

The undervoltage circuit as shown in FIG. 6 removes the gate signals to the power SCRs 1 and 2 of the main and teaser inverters upon sensing of a low D.C. power voltage lead. The output of the circuit removes the gates to the power SCRs but not the control SCR3. The third SCR will fire to shut off the power SCRs since the storage in the output filter of the inverter will be sufficiently high.

A low voltage reference point is supplied by the Zener diode 602 and holds the emitter of transistor 600 at a potential which is less than the voltage developed at the base of transistor 600 connected across the voltage divider network formed by resistors 604 and 606 connected across the high voltage D.C. supply and ground. Consequently, under normal conditions the transistor 600 is nonconducting and the transistor 608 is forwardly biased since its emitter is connected to the voltage developed across Zener diode 602 through series connected resistors 612 and 614. Both the base of transistor 608 and the collector of transistor 600 forms a common junction with resistor 616, the other side of which is connected to ground. The forward biasing of transistor 608 provides current to transistor 268 in FIGURE 2. Consequently, the nonconduction of transistor 608 operates to provide a large 30 volt signal to be developed across the collector of transistor 268 which is then sufficient to inhibit the gate signals to the main and teaser power inverters.

If the high voltage B supply decreases, the base of transistor 600 drops until a point is reached where transistor 600 begins to conduct. As soon as transistor 600 conducts, transistor 608 draws less current which in turn tends to forward bias the emitter-to-base voltage of transistor 600. Hence, transistor 608 is rapidly cut off resulting in the cutoff of transistor 268 in FIGURE 2 thereby removing the gate drive from the main and teaser power SCRs. Upon a raising of the high voltage D.C. supply, the opposite action will occur in a trigger fashion reapplying the gates to the power SCRs.

Short circuit sensor

The purpose of this circuit is to recognize the occurrence of a short circuit in any of the output phases. The circuit produces a positive going signal when the inverter output voltage suddenly drops to a value below a predetermined amount. The circuit is specifically designed to speed up the response of the fourth SCR circuit to protect the main and teaser inverter power circuits.

Figure 9:
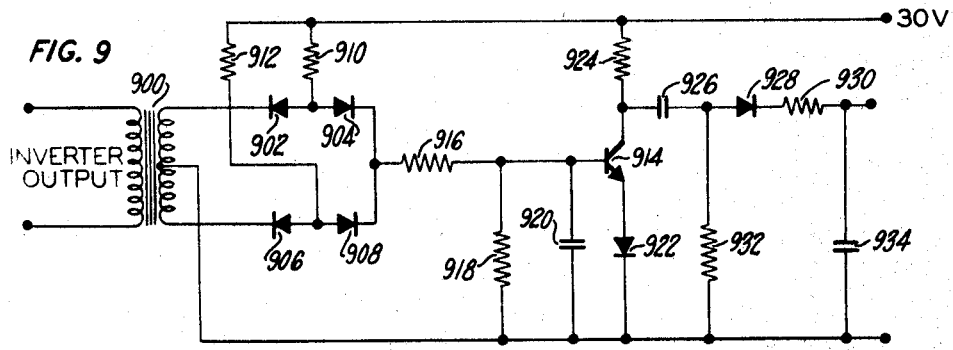
FIGURE 9 shows a short circuit sensor.

In FIGURE 9 a transformer 900 has its primary connected in parallel with one of the phases to the output load and its secondary connected across two pairs of series back-to-back connected diodes 902, 904, 906 and 908. Each of the diode pairs have their anodes connected together and through resistor 910 and 912 connected to the low regulated B+ supply. Each of the other cathodes of the diode pairs are joined to be connected from the base by transistor 914 through a resistor divider network comprising resistors 916 and 918. The base of transistor 914 is connected to capacitor 920 to ground as well as through resistor 918 to ground. The emitter of the transistor is returned to ground through a diode 922 and its collector is connected to the low regulated B+ supply through resistor 924 and to the output via capacitor 926, diode 928 and resistor 930. The anode of the diode 928 is connected with one end of the capacitor 926 through a resistor 932 to ground, and similarly the output is capacitively coupled to ground via capacitor 934.

It is to be understood that for each of the phases a similar circuit is employed and the outputs of each is connected in parallel to form a single output applied to diode 258 of FIG. 2.

When the inverter is operating normally, 120 volts is seen on the primary of transformer 900. The secondary of transformer 900 has 60 volts on each side of the center tap. The polarity at the ends of the secondary winding alternate between plus and minus 60 volts each half cycle. Therefore, when the top of the secondary winding is positive, diode 902 is reverse biased and diode 904 is forward biased, creating a first current path from the 30 volt source to capacitor 920 by way of resistor 910, diode 904 and resistor 916. During this same time interval, the bottom of the secondary winding has a negative polarity, forward biasing diode 906 and reverse biasing diode 908. A second current path is established from the 30 volt source to the bottom of the secondary winding by way of resistor 912 and diode 906. In particular note that although two current paths are created from the 30 volt source, there is sufficient current in the first path to charge capacitor 920 to approximately 2 volts.

On the alternate half cycle, the upper end of the secondary winding becomes negative and the bottom end becomes positive. In this condition, diode 906 is reverse biased and diode 908 is forward biased, furnishing a path to capacitor 920 through resistor 912, diode 908 and resistor 916. A path is also established from the 30 volt source to the top of the secondary winding by way of resistor 910 and diode 902. It can be seen that by this technique, every half cycle of the output voltage furnishes a charge on capacitor 920. With capacitor 920 charged, transistor 914 is held at saturation.

When the output voltage of the inverter is shorted, diodes 904 and 908 are reversed biased and diodes 902 and 906 are forward biased. Consequently, the voltage across capacitor 920 decays to ground through resistor 918. The collapse of the voltage across capacitor 920 turns transistor 914 off, and a positive pulse created by the rise of the collector voltage of the transistor is coupled to the output. The output pulse can then be used to fire the fourth SCR circuitry 234 as previously discussed in relation to FIGURE 2. Of importance in the proper operation of the circuit during a short circuit is the fact that the junction point of diodes 902, 904 and resistor 910, and the junction point of diodes 906, 908 and resistor 912 are placed at a potential just above ground because of the forward biasing of diodes 902 and 906. Therefore, the anodes of diodes 904 and 908 are held at a lower potential than their cathodes, reverse biasing these diodes when the primary of transformer 900 becomes shorted. During this same time interval, the positive potential on the base of transistor 914 hold the cathodes of diodes 904 and 908 positive with respect to their anodes, thereby insuring the reverse biasing of diodes 904, 908.

Fourth SCR extinguishment

Figure 7:
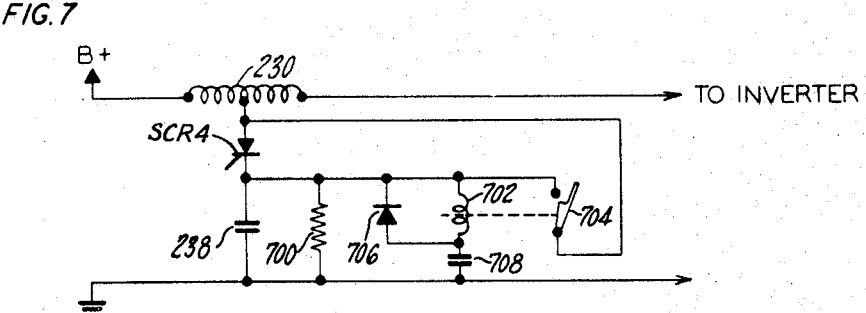
FIGURE 7 shows a shutoff circuit for a silicon controlled rectifier.

FIGURE 7, in a simplified form, shows the fourth SCR cricuit in combination with the choke 230, the capacitor 238, the resistor 700 connected across the capacitor 238 and schematically representing the series combination of resistor 240 and 242. The purpose of this circuit to to assure the extinguishment of the fourth SCR as will be explained in connection with its operation.

The SCRs 1 and/or 2 may fail to properly commutate and thereby draw an excessive high current through the resistor 212 in FIGURE 2. The high current through the resistor 212 produces a misfire signal which causes the fourth SCR gate to be activated and turn ON the fourth SCR as previously described. When the fourth SCR is gated ON, SCR1, SCR2 and SCR3 are turned OFF for a short period of time because the center tap of transformer 200 is brought to ground level. While the center tap of transformer 200 is grounded for the short time period, a signal indicative of the turning ON of the fourth SCR and applied to the base of transistor 266 is used to remove the gate signals to the power SCRs 1 and 2. Thereafter when the center tap of transformer 200 becomes positive again, the SCRs 1 and 2 will not be able to conduct in the absence of a gate signal. The voltage across the capacitor 238 will be permitted to decay at some predetermined rate and when it has decayed sufficiently the SCR1 and SCR2 gates will be permitted to return to produce power from the inverter circuitry.

If for some reason the fourth SCR does not turn OFF, the capacitor 238 will remain charged and the gates to the power SCRs 1 and 2 are not permitted to be activated. This is undesirable and can only be corrected by an additional turn OFF circuit described in relation to FIGURE 7. The circuit comprises a relay 702 which operates a switch 704 that is directly connected across the fourth SCR anode and cathode. Normally, in the absence of current through the relay coil 702, the switch 704 is open. In series with the coil 702 and connected to ground is the capacitor 708. A diode 706 is connected in parallel with the coil 702 and having its anode connected to the capacitor 708.

When the fourth SCR fires, current goes through the relay coil 702 which causes its contacts to close. The time that it takes to close is both a funcion of the electrical and mechanical time constant but can be controlled so that it remains closed after the current in capacitor 238 has been reduced to a negligible value. At the time that the switch 704 closes, it will take all the current through its contacts that might otherwise be passing through the fourth SCR. The fourth SCR will therefore shut off and stay off since it will have no gate signal and its holding current will drop below that needed to maintain it in condition. The relay coil 702 thereupon will have sufficient voltage across it to keep it actuated until capacitors 708 charges sufficiently to drop voltage across the relay coil to cause it to open. When the relay opens the voltage across the switch 704, the voltage across the contacts and the current through it will be at a minimum. The time the relay is closed is determined by the relay design and the value of the capacitor 708. Repetition of this sequence is assured by discharging the capacitor 708 through the diode 706 and resistor 700.

*Short-type identifier*

Figure 3:
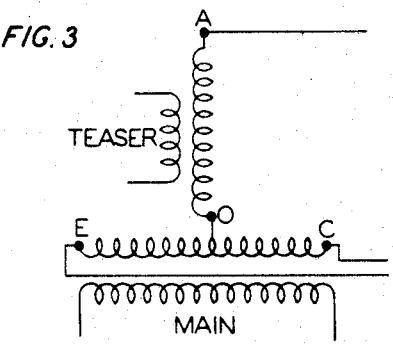
FIGURE 3 shows the two-phase to three-phase transformation.
Figure 8:
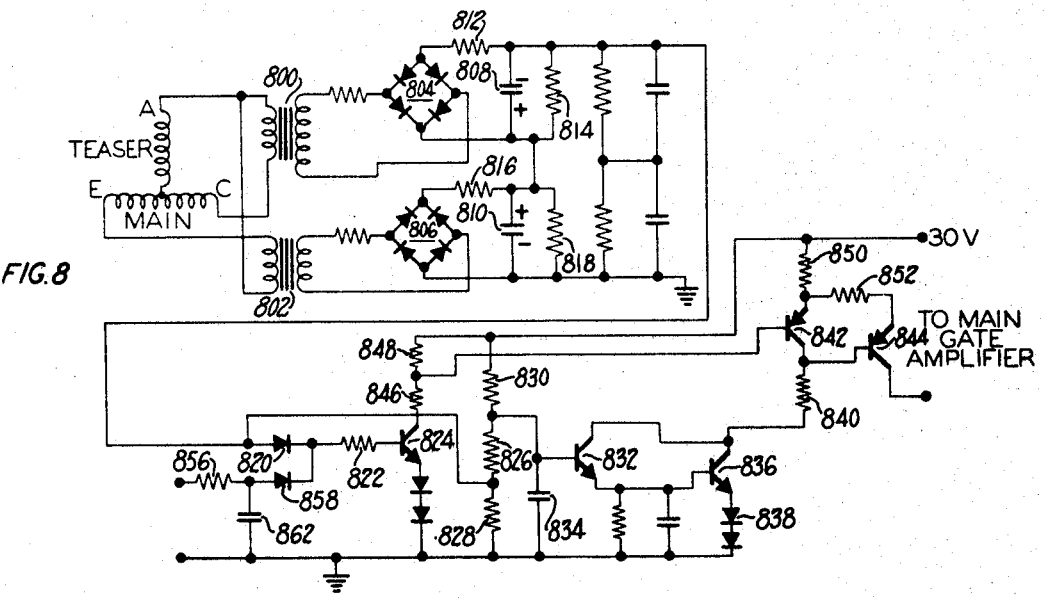
FIGURE 8 shows a circuit to identify the shorted phase in a polyphase circuit and the main gate inhibit circuit.

This circuit as shown in FIGURE 8 is intended to identify the particular phase having a short in order to prevent misfiring of the power SCR inverter. Such misfiring has been found to occur at low loads and with shorts across particular phases of the output windings. With particular reference to FIGURE 3, the schematic representation of a well-known two-phase to three-phase Scott-T conversion is shown. Thus, the output from the main inverter phase is applied across one transformer having a secondary with terminals E and C. The teaser inverter output is applied across a transformer having a secondary winding connected across A and O where O represents the center tap of winding E–C.

The circuit is specifically designed to hold off the voltage applied to the main inverter circuit when a short is applied between either the terminals A and C or A and E. On the other hand, the main inverter voltage should not be held off when a short is applied to the terminals C and E or across A, C and E simultaneously.

As shown in FIGURE 8, the phase voltages A–E and A–C are applied to two transformers 800 and 802 and each of the secondaries of these two transformers is applied to a full wave rectifier circuit 804 and 806. The output of the diode network 804 is filtered through a D.C. voltage across the capacitor 808 with the polarity as indicated. Similarly, the output of the diode bridge 806 produces a D.C. voltage across the capacitor 810 along the polarities as indicated. The positive sides of capacitors 808 and 810 are connected together so that the voltage measured across the negative sides of the capacitors 808 and 810 produces a difference signal corresponding to the difference in the voltage between the phases A–E and A–C. The resistor 812 interconnects the negative side of capacitor 808 with the negative side of the diode bridge network 804, and the positive side of capacitor 808 is connected to the positive output of this diode bridge. The resistor 814 is connected in parallel with capacitor 808. In a similar manner but with reversed polarities, the resistors 816 and 818 are connected to the diode bridge network 806 and capacitor 810. The output across the negative terminals of the capacitors 808 and 810 produces a signal indicative of the difference between phases A–E and A–C and is applied through diode 820 through a resistor 822 to the base of transistor 824. It is also applied to the center point of a series resistor combination comprising resistors 826 and 828, one end of which is connected to ground and the other through a resistor 830 to the low regulated B+ supply. The voltage developed across the series combination of resistors 826, 830 and 828 is applied to the base of transistor 832 with the base also being connected to ground through a capacitor 834. Essentially in parallel with the transistor 832 and used for amplifying the signals applied to the base transistor 832 is the circuitry involved with transistor 836. The latter transistor has its base directly connected to emitter of transistor 832 and its emitter connected to ground through a diode combination 838. The collectors of transistors 832 and 836 are connected together and through a resistor 840 connected to the collector of transistor 842 and the base of transistor 844. The base of transistor 842 in turn derives its input signal from the collector circuit of transistor 824 by connecting it to the midpoint of the series combination of resistors 846 and 848. Resistor 846 is connected to the collector of transistor 824 and resistor 848 is connected to the 30 volt supply. The emitter of transistor 842 is connected to the 30 volt supply through resistor 850 and via a resistor 852 is connected to the emitter of transistor 844. The output from the collector of transistor 844 is applied to the main inverter gates drive circuitry 228.

Three separate modes of operation of this circuit are possible and these are as follows. When there is a short across the A–C phase, this causes all the inverter gates to be shut off in a manner described in connection with the short circuit sensor and the fourth SCR circuit of FIGURE 2. Since the firing of the fourth SCR circuit produces a large positive voltage rise at the collector of transistor 268 and this signal is applied through the series combination of resistor 856 and diode 858 to the base of transistor 824, and since the capacitor 862 is charged by this signal, the transistor 824 will remain forwardly biased even after the voltage from the collector of transistor 268 that shut off the gates to the power inverters has disappeared. Forwardly biasing transistor 824 will hold transistor 842 forwardly biased and maintain transistor 844 cut off. As long as transistor 844 is off, the main inverter will remain turned off and only the teaser inverter will be permitted to turn on. If no other signal was present, the main inverter would turn on a short time later after the voltage across the capacitor 862 has been discharged.

However, a short was applied to the phase A–C so that when the teaser inverter begins to come up in voltage, there will be no voltage developed across the transformer 800 although there will be a voltage developed across the transformer 802. As a result, a positive voltage is generated at the input to diode 820 which is sufficient to keep transistor 824 conducting and hold transistor 844 cut off as long as the short across the winding A–C exists. The main inverter output, therefore, will not turn on as long as the short exists.

In the event a short occurs across the winding A–E, the initial steps described in relation to the short occurring across winding A–C are repeated.

However, when the teaser winding comes up in voltage with A–E shorted, there will be no voltage across the secondary of transformer 802 but there will be a voltage across the transformer 800 so that a negative voltage will be applied at the input to diode 820. This negative voltage will permit transistor 824 to become cut off. However, the negative voltage is also applied in effect to the base of transistor 832 which is thereby cut off and in turn will remove the base drive from the transistor 844 by also cutting off transistor 836. This conduction will remain until the short across the winding A–E has been removed.

When a short across winding C–E or all three phases occurs, the initial steps described in relation with the short across A–C are repeated.

However, when the teaser winding voltage comes up, the voltages developed across the secondary of the transformer 808 or 802 are equal and the voltage difference sensed at the input to diode 820 is so small that it is insufficient to turn ON either transistor 824 or turn OFF transistor 832. Consequently, after the voltage across the capacitors 860 and 862 has decayed sufficiently, transistor 824 will be permitted to turn OFF, transistor 842 will be turned OFF, and both transistors 832 and 836 will be biased ON to permit transistor 844 to apply full power to the main gates thereby allowing the circuit to resume normal operation.

It thus may be seen that a short across one particular phase of a multiphase circuit can be detected to thereafter protect the power inverters from misfiring and catastrophic failures.

Overvoltage circuit

Figure 10:
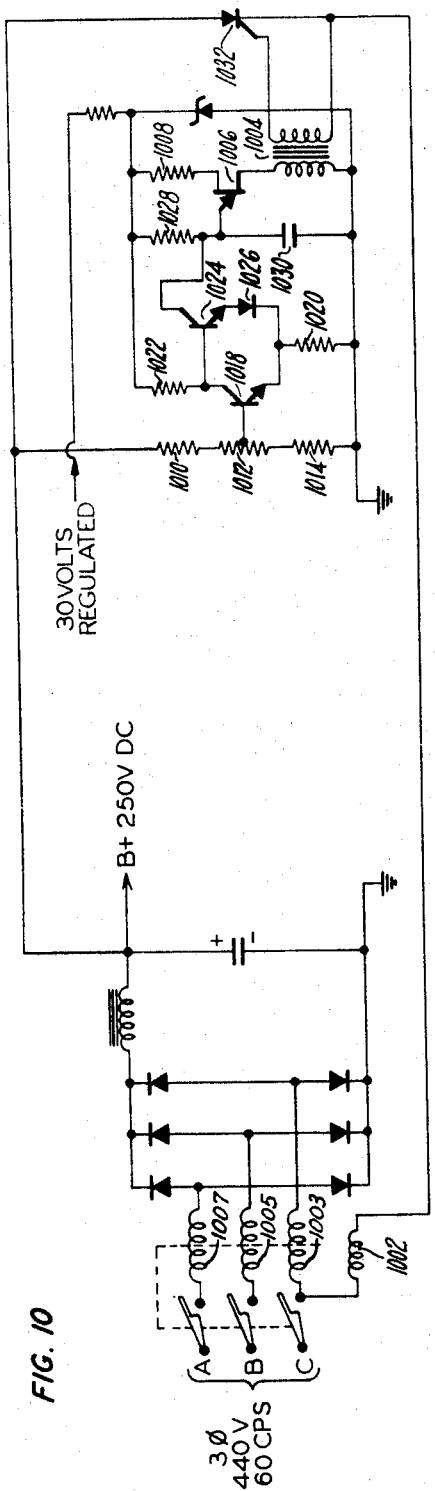
FIGURE 10 shows an overvoltage protection circuit.

This circuit is intended to solve the problem when high input power and high input voltage changes cause the breaking down of the input rectifier diodes and change the voltage sharing across the power SCRs in the inverter circuits. FIGURE 10 shows a circuit which is intended to provide this overvoltage protection. Each of the input lines from the three-phase input power is passed through a circuit breaker and all of these three circuit breakers may be tripped by another circuit breaker trip coil 1002. In series with the trip coil is an SCR 1032 whose gate is connected to the secondary of the transformer 1004. The primary of the transformer 1004 derives its input from one of the bases of a unijunction transistor 1006 and the other terminal of the primary is returned to ground. The other base of unijunction 1006 is returned through a resistor 1008 to the regulated low voltage B+ supply. The input to the overvoltage sensing circuit is derived by monitoring through a series resistor network connected across the high voltage D.C. supply for powering the main and teaser inverters. The series resistor combination comprises resistors 1010, 1012 and 1014. Resistor 1012 is a potentiometer with its arm connected to the base of transistor 1018. The emitter of transistor 1018 is connected to ground through resistor 1020 and the collector of this transistor is returned to a regulated voltage derived from the 30 volt supply through resistor 1022. The collector of transistor 1018 is connected to the base of transistor 1024 which has its emitter connected through a diode 1026 to the emitter of transistor 1018. The collector of transistor 1024 is returned through a resistor 1028 to the regulated supply. A capacitor 1030 is connected from the collector of transistor 1024 to ground.

The input voltage is sensed by the wiper arm of potentiometer 1012 and when it exceeds the triggering voltage of the Schmidt trigger circuit formed by the transistors 1018 and 1024, the state of transistor 1024 switches from ON to OFF so that capacitor 1030 may then charge from the supply through resistor 1028. The time constant of the resistor 1028 and capacitor 1030 combination is so set that it would fire unijunction transistor 1006 many times compared to the basic input frequency. When capacitor 1030 charges to the triggering voltage of the unijunction transistor, the latter fires and in turn applies a gating signal to the SCR 1032. Once SCR 1032 fires, the current is permitted to flow through the circuit breaker trip coil 1002 which then in turn causes all of the other circuit breakers through which the three-phase input power is applied to trip and break away. The advantage of this circuit is that the circuit breakers are tripped at a preset voltage independent of the current flowing through the circuit breaker coils 1003, 1005 and 1007. The current level which trips the trip coil 1002 does not grow slowly but appears as a step function; on the other hand, the circuit will not react to a low power transient since the low unregulated voltage sensed by the potentiometer 1012 is derived from the high voltage D.C. supply which is connected in turn to a large capacitor bank of filters that is uncapable of following rapid input voltage fluctuations.

Constant current control circuit

As described in relation to FIGURE 2, a constant current control is applied to the conduction angle control circuit 232 at the unijunction input 223. Each of the main and teaser conduction angle control circuits is supplied with such a constant current input. The purpose of this circuit is to provide the system with a constant output current during short conditions so that the equipment responsible for the short-circuit condition may be forced off the line by blowing its input fuse or trip its input circuit breaker.

Figure 11:
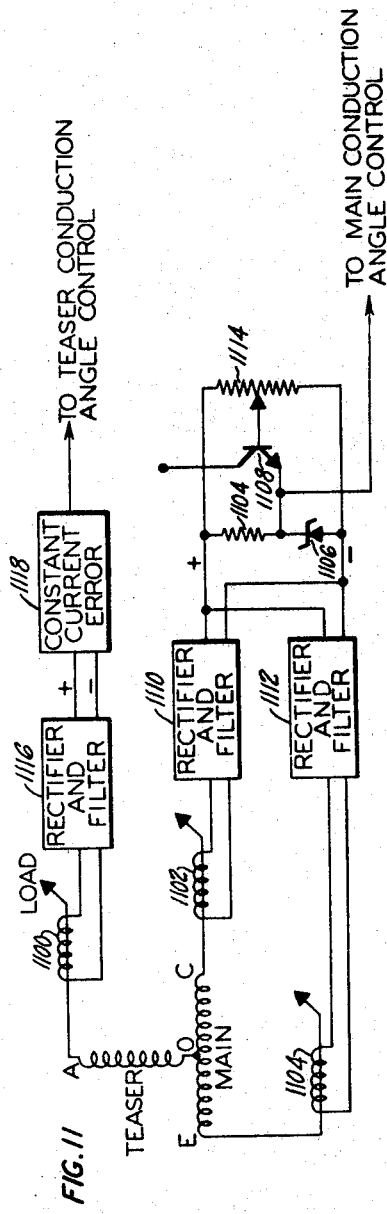
FIGURE 11 shows a constant current control circuit.

The constant current circuit senses the current flow through each of the three wires leading from the output transformer. Hence, with reference to FIGURE 11, the output phase voltages are developed across the terminals A, E and C where the current sensed by current transformer 1100 is the teaser current, and the combination of the current transformers 1102 and 1104 indicate the total main current. Both of the main current transformers outputs are rectified and filtered and placed in parallel combination so that the largest of the two signals will dominate the subsequent circuitry. This circuitry includes across the rectified output a resistor 1104 in series with a Zener diode 1106 to provide a reference voltage for an emitter of transistor 1108. The emitter of this transistor is connected to be biased by the Zener diode reference voltage and the base of transistor 1108 is connected to the wiper arm of potentiometer 1114 connected across the D.C. output from the rectifiers 1110 and 1112. The collector of transistor 1108 is connected to the low regulated B+ supply. The output from the main constant current detector is obtained from the emitter of transistor 1108 and is directly connected to the input of unijunction 215 as shown in FIGURE 2. In a similar manner, the constant current output signal is derived for the teaser winding and teaser conduction angle control circuit.

In operation when a short circuit is detected in either one of the main windings, the voltage across the main winding will essentially drop to zero and the current supplied by the voltage control circuitry shown in FIGURE 2 is effectively deactivated by the absence of a signal to its input. An output, however, has been now generated from one of the rectifier and filter networks, for example, 1110. With the polarity, as indicated, a reference voltage will be developed across the Zener diode 1106. The potentiometer 1114, however, as connected to the base of the transistor 1108 controls a value of the voltage at which the transistor 1108 commences to conduct and this voltage is proportional to the current flowing through either current sensor 1102 or 1104. The largest of the two voltages produced by rectifier 1110 and 1112 will govern the conduction of transistor 1108 and in this manner these voltages are connected in a most-gate fashion. In a similar manner to that described in relation to the main currents occurring in the teaser winding is sensed by current sensor 1100 rectified and filtered to produce a D.C. voltage which then develops a current source to be applied to the conduction angle control for the teaser inverter.

Figure 4:
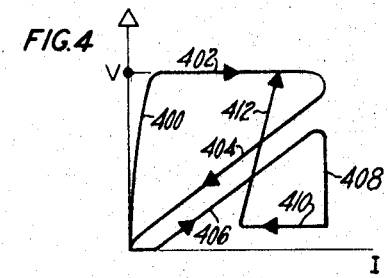
FIGURE 4 shows the inverter output voltage response as a function of current under various conditions.

The system operation of the complete inverter as heretofore described, can best be understood in relation to a voltage current diagram shown in FIGURE 4. As the input power is applied to the system, the output voltage will rise relatively slowly along the portion 400 since the control circuitry that commences with firing of the fourth SCR forces the shut off of all of the power inverters and removes the signals to the gates of the SCRs until the high and low voltage D.C. supplies have had an opportunity to rise to their design levels 402. When this level is reached and after the delay action produced by capacitor 276 and resistor 278 as shown in FIGURE 2 to cut back the conduction angle in both the teaser and the main inverters, the output voltage commences to rise along figure 400 up to the regulated level as shown by the 402 part of the curve. The reference value of this voltage is determined by the setting of the potentiometer 235 shown in FIGURE 2. As the load is increased and additional currents are demanded, the voltage remains constant but the current builds up. When the short circuit occurs in a sudden fashion, its effect upon the system is a complete cutback of the output power as shown by the curved portion 404. Since the system is designed to produce a constant current output, the constant current control acting upon the conduction angle control circuitry as typically shown in FIGURE 2 with circuitry 232, takes over control because the output voltage is so low that no useful control signal can be derived from the potentiometer 235. The constant current control circuitry thereupon increases the output current and a small amount in the output voltage along the curve 406 to the level determined by the potentiometer and the constant current control circuit. This constant current will be supplied regardless of the drop in the output voltage as might happen as shown along the portion of the curve 408. If the short circuit is suddenly removed, the initial reaction of the system will be evidenced by a drop in the current supply that is shown by the portion of the curve 410. As the current drops the voltage control network again commences to take over control and drives the output voltage to the predetermined control level along the curve 412.

If, on the other hand, the short circuit is a gradual phenomena so that the constant current control takes over from the voltage control in a gradual manner, then the transition from constant voltage to constant current will occur without the cutback and subsequent rise of curves 404 and 406 but directly enter the constant current mode of curve 408.

It is to be understood that the invention is not limited to the specific embodiments herein illustrated and described, but may be used in other ways without departure from its spirit as defined by the following claim.

I claim:

1. An inverter control circuit for starting the inversion of D.C. power to A.C. power with controlled rectifiers comprising:
    means for sensing the initial application of D.C. power to said controlled rectifiers and producing a starting signal indicative thereof, said power sensing means further including:
        a differential network having a capacitor in series with a resistor, said capacitor coupled to said D.C. power, the resistor coupled to the return of the D.C. power,
    means responsive to the starting signal for controlling the conduction times of said controlled rectifiers and cutting back the conduction times of the controlled rectifiers to a predetermined minimum duration, the common point of said resistor and capacitor being coupled to said conduction control means, and
    means responsive to said starting signal for temporarily removing the D.C. power from said controlled rectifiers.

References Cited
UNITED STATES PATENTS 3,262,036 7/1966 Clarke et al.
3,315,146 4/1967 Paice _____ 321—45

JOHN F. COUCH, *Primary Examiner.*

WARREN E. RAY, *Examiner.*

W. H. BEHA, JR., *Assistant Examiner.*